United States Patent [19]
Netzel et al.

[11] Patent Number: 4,768,790
[45] Date of Patent: Sep. 6, 1988

[54] MECHANICAL FACE SEAL HAVING CENTERING MEANS

[75] Inventors: James P. Netzel, Skokie; Mark G. Pospisil, Park Ridge, both of Ill.

[73] Assignee: John Crane-Houdaille, Inc., Morton Grove, Ill.

[21] Appl. No.: 53,311

[22] Filed: May 22, 1987

[51] Int. Cl.$^4$ .............................. F16J 15/34
[52] U.S. Cl. .................. 277/81 R; 277/82; 277/84; 277/93 SD
[58] Field of Search ............. 277/65, 81 R, 82, 84, 277/85–87, 93 R, 93 SD

[56] References Cited

U.S. PATENT DOCUMENTS

| | | | |
|---|---|---|---|
| 3,502,343 | 3/1970 | Pustelnik | 277/84 X |
| 3,675,933 | 7/1972 | Nappe | 277/87 X |
| 3,807,742 | 4/1974 | Hershey | 277/87 |
| 3,918,724 | 11/1975 | Alley | 277/84 X |
| 4,415,165 | 11/1983 | Martini | 277/65 X |

FOREIGN PATENT DOCUMENTS 699001  12/1964  Canada ............. 277/93 R

*Primary Examiner*—Robert S. Ward
*Attorney, Agent, or Firm*—Kinzer, Plyer, Dorn, McEachran & Jambor

[57] ABSTRACT

A mechanical seal for use between a housing and a rotatable shaft supported by the housing, having adjacent annular primary and mating sealing rings, each ring having a generally radial sealing face. Means seals and holds the first sealing ring nonrotatably relative to the housing, and means seals and holds the second sealing ring to rotate with the shaft. One sealing ring is movable axially of the shaft, and springs urge this one ring toward the other sealing ring, which is axially fixed relative to the shaft. The axially moveable seal ring is centered coaxially with respect to the axis of the seal ring through engagement of a centering element which is centered relative to the shaft and which engages the axially moveable sealing ring to center it relative to the shaft. The centering element engages the axially moveable sealing ring to effect such centering at the periphery of the axially moveable ring exposed to the pressurized fluid to be sealed.

9 Claims, 2 Drawing Sheets

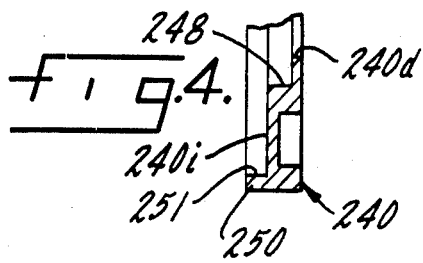
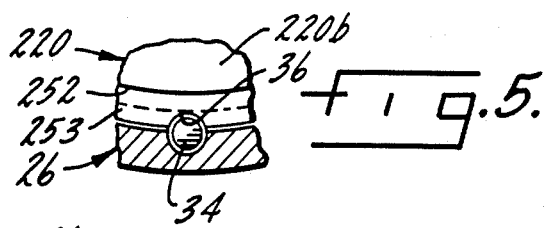
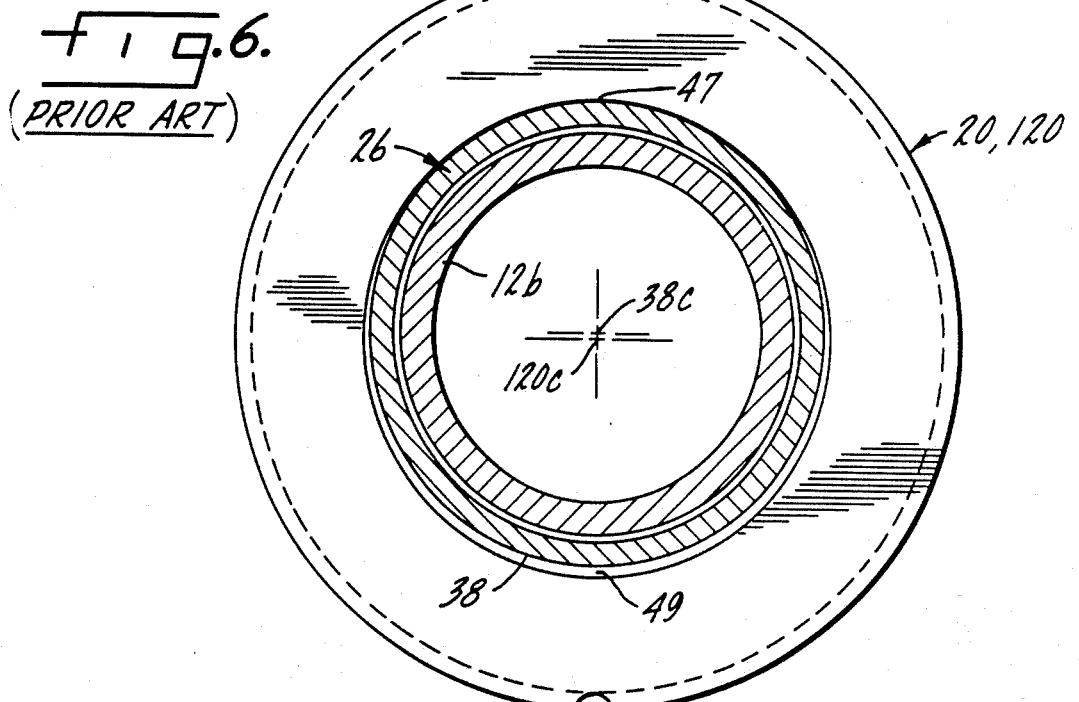
Fig. 6. (PRIOR ART)
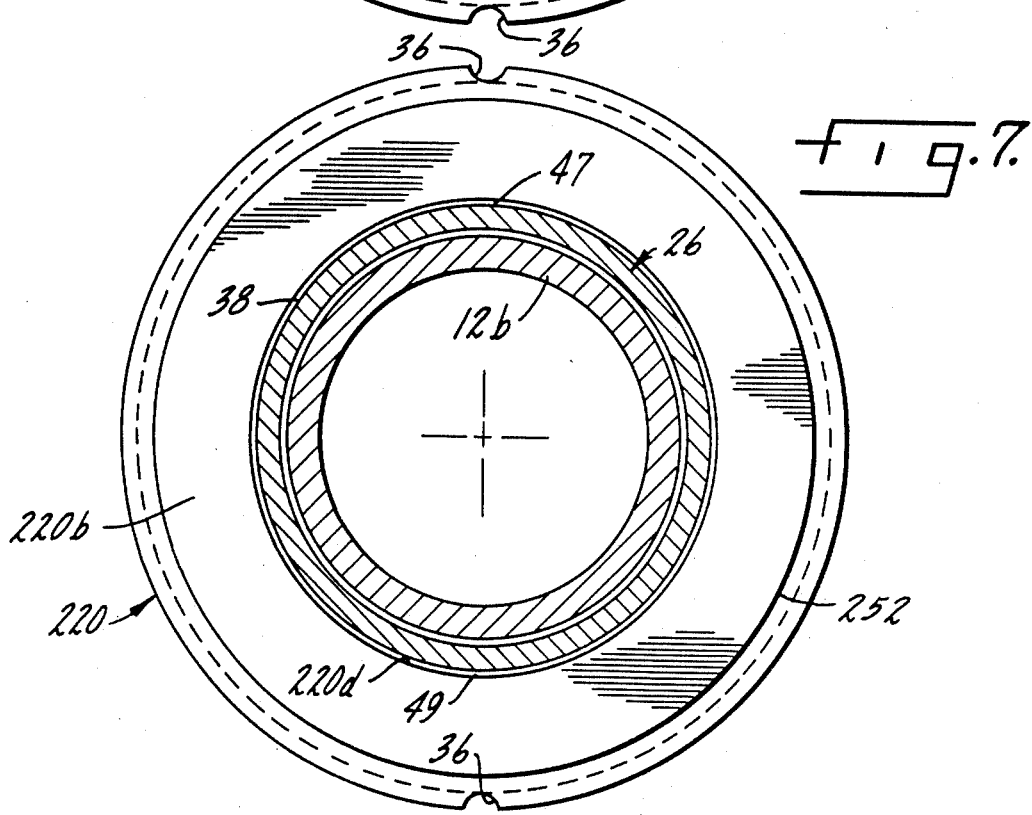

MECHANICAL FACE SEAL HAVING CENTERING MEANS

FIELD OF THE INVENTION

This invention relates to rotary mechanical seals having relatively rotating annular sealing faces for containing fluid under pressure, between a housing and a shaft that is to be rotated relative to the housing. In particular it relates to such seals having provision to insure coaxial disposition of the seal rings.

BACKGROUND OF THE INVENTION

Mechanical seals between a rotatable shaft and its stationary supporting housing, may include annular sealing rings respectively sealed and connected or keyed relative to the shaft and to the housing, and having annular sealing faces disposed facing one another. The relative rotation of the shaft and housing takes place between these sealing faces; and they are adapted to cooperate closedly with one another to minimize fluid leakage between the faces, from a high pressure at one radial edge of the sealing faces to a lower or atmospheric pressure at the opposite radial edge.

At least one of the sealing rings generally is movable axially of the shaft, and biased by springs or the like, to urge the annular sealing faces closely proximate, or even substantially against one another, particularly when the shaft is not being rotated. However, to reduce wear between the sealing faces, as they are being moved relative to one another when the shaft is being rotated, it is intended that a small fluid film gap be established between the sealing faces. The gap thickness is determined when the forces acting on the moving ring member balance; such forces including the hydrostatic and hydrodynamic fluid pressure acting on the opposite faces of the member, and the force of the closing spring. The fluid forces may be from the contained fluid, although a secondary lubricating fluid could also be used.

When properly designed, the fluid film gap between the sealing faces may be meaured in tenths-of-thousandths of an inch (0.0001"), and the leakage through the gap is minimal. This sealing gap nonetheless eliminates or minimizes direct contact between the sealing faces, to significantly reduce wear of such faces; and further to significantly reduce frictional drag, heat buildup and power consumption of the mechanical seal. With an adjacent sealing faces be made to very close tolerances; and which sealing faces, during operation, remain true and parallel relative to one another.

Precise positioning of the seal rings with respect to each other is particularly critical in dry running gas seals. Only the contained fluid itself, typically a gas, is used. Gas generally is not an effective lubricant and control of hydrostatic and hydrodynamic forces is relied on to provide a fluid film gap between the sealing faces, to avoid direct surface contact. Even so, the gap between the sealing faces must be very small to contain a gas, without allowing excessive leakage.

A successful design of a dry running seal has a plurality of circumferentially spaced shallow radial grooves provided in one of the sealing faces. These grooves extend spirally from the high pressure edge part-way across the face toward the low pressure edge. The pressure of the contained fluid at the high pressure edge, is present via the grooves to an interior region of the sealing faces, to provide for a hydrostatic pressure tending toward separation of the sealing faces. As the faces rotate, the pumping action of the grooves creates a hydrodynamic force separating the faces to some gap, until counterbalanced by the forces of the springs and the opposing fluid forces tending to close the gap. This avoids direct contact between the sealing faces. U.S. Pat. Nos. 3,499,653 and 4,212,475 disclose specific embodiments of mechanical dry running gas seals, and the teachings of such patents are incorporated herein by reference.

In a mechanical seal of the type disclosed in the above mentioned patents, the sealing and/or film leakage gap is dynamic and changing. When the shaft is not rotating the seal faces are in contact. As the shaft rotates the pumping action of the seal face grooves causes the faces to move apart. Other factors such as axial shaft movement, thermal distortion of parts, pressure variations, etc. require that one seal face accommodate axial movement. One sealing ring is, therefore, moveable axially along the shaft. As noted the gap for a dry running seal may be measured in tenths-of-thousandths of an inch (0.0001"), and the movement of the one sealing ring is comparable. Any resistance hindering the moveable sealing ring in this very small range detracts from the sensitivity of the mechanical seal. Excessive resistance preventing compensating movement of the movable ring may hold the gap between the sealing surfaces too small, causing wear, overheating and/or even destruction of the adjacent sealing faces; or may keep an open gap from closing, allowing excessive leakage.

Of imporatnce also is the fact that forces on the sealing faces must be reasonably uniform and symmetrical of the sealing faces and the rotational axis of the sealing faces. This means that the sealing faces must be properly centered relative to one another. If the sealing faces are offset, from a coaxial position, or caused to move out of parallel relative to one another, the sealing faces at one local region may be forced too close together or even contact one another, while they may be spaced apart excessively at another spaced local region . . . to have both wear and leakage problems. There factors are augmented by any non-coaxial position of the seal rings.

Centering of the relatively rotating sealing rings is important to seal performance and seal component life. If one ring is disposed in a position offset from the axial centerline of the other, unequal loading can occur, for example, from the fluid pumped between the sealing faces by the spiral pumping grooves.

In prior designs with seals exposed to the high pressure to be sealed at the outside diameter of the seal rings, it has been adequate to center the seal rings at the inside diameter. For operating pressures and temperatures previously experienced, such an approach had been adequate. However, as pressure and temperatures experienced in seal environments have become more severe, centering of the seal rings becomes more significant and critical.

SUMMARY OF THE INVENTION

This invention provides for insured coaxial alignment of the relatively rotating sealing rings of a mechanical seal, even at operating conditions experienced in present day seal environments. This is accomplished by providing centering means for the axially moveable sealing ring of the seal which means affect centering adjacent the periphery of the seal ring which is exposed to the high pressure to be sealed. The seal is thus centered at installation and the increased pressure at operating conditions tends to disengage the axially moveable ring from the centering means.

The present invention provides a mechanical seal for use between a housing and a rotatable shaft, and has adjacent annular primary and mating sealing rings, each with a generally radial seal face. The first sealing ring is sealed and fixed nonrotatably relative to the housing, and the second sealing ring is sealed and keyed to rotate with the shaft. One sealing ring is free to move axially, and biasing means urge this one ring toward the other sealing ring, to bring said seal faces close to one another. A disc is interposed between the biasing means and the axially moveable ring, adapted to receive and impart the force of the biasing means to the ring. Means centers the disc coaxially of the shaft; and means cooperating between the disc and the axially moveable ring centers that ring coaxially of the disc, and thus the shaft.

The centering means for the axially moveable ring is disposed at the edge of the seal ring which is exposed to the high pressure to be sealed such that as operating pressures are reached, the centering means is disengaged from the axially moveable ring. The present invention is particularly suited for gas seals that are dry running, that is, that receive no lubrication from an exterior source, and/or for seals where shaft diameters may exceed three inches, where fluid pressures may be as high as 2000 psi, and where temperatures may be as high as 500° F.

BRIEF DESCRIPTION OF THE DRAWINGS

FIG. 4 is a fragmentary sectional view, similar to FIG. 3, of the disc used in the mechanical seal isolated by itself;

FIG. 5 is a fragmentary sectional view, taken generally from line 5—5 in FIG. 3, illustrating the keying arrangement of the primary sealing ring;

FIG. 6 is an elevational schematic view of the prior art mechanical seals of FIGS. 1 and 2, illustrating a probable eccentric operating position of at least one of the components and FIG. 7 is an elevational view of the improved seal of FIG. 3, illustrating a probable concentric operating position of the corresponding similar component(s).

DETAILED DESCRIPTION OF AN ILLUSTRATED EMBODIMENT

Figure 1:
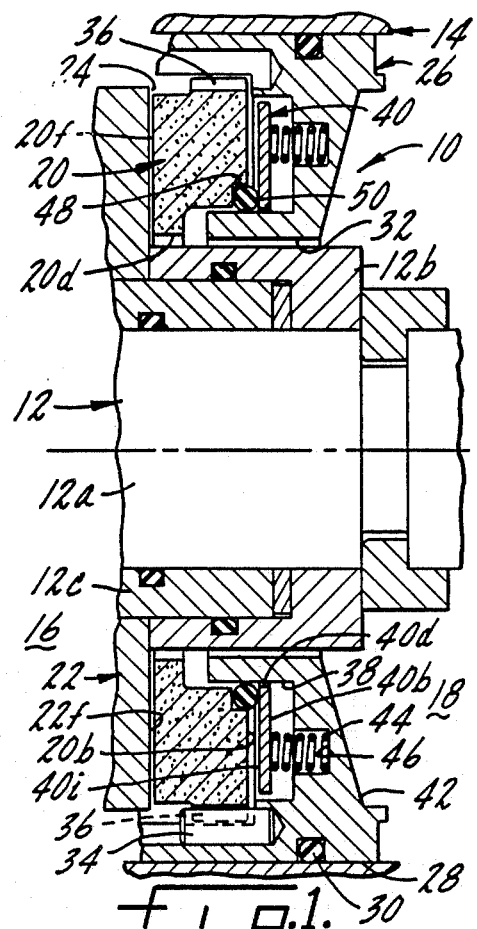
FIG. 1 is a longitudinal sectional view of one prior art mechanical seal used for sealing a shaft adapted to rotate relative to a housing.

FIG. 1 illustrates a known mechanical seal 10 of the type for which this invention forms an improvement. A shaft 12 is formed of central shaft 12a and sleeves 12b and 12c and is mounted by bearings (not shown) to rotate relative to a housing 14. For purposes of this disclosure, the housing 14 typically will have a region 16 on one side of the seal 10 (the inboard side) that may contain a fluid, such as a gas, under high pressure; while a region 18 on the other side of the seal 10 (the outboard side) may be at a substantially lower pressure, or at atmospheric pressure.

The mechanical seal 10 has a primary sealing ring 20 and an adjacent mating sealing ring 22. The mating ring 22 is secured coaxially sealed to the shaft 12, to rotate therewith; while the primary ring 20 as illustrated is sealed and keyed to the housing 14, to be stationary relative to the housing. Annular sealing faces 20f and 22f are formed on the respective primary and mating rings 20 and 22, symmetrically of the shaft 12, adapted to be fit closely adjacent and even substantially flush against one another. The sealing faces 20f and 22f are generally disposed radially of and normal to the shaft 12.

With the primary sealing ring 20 keyed to the stationary housing 14, and with the mating sealing ring 22 keyed to rotate with shaft 12, rotation of the shaft and the mating ring 22 causes the sealing faces 20f ad 22f to be moved relative to one another in a direction in line with such faces. In a properly working mechanical seal, this movement occurs across a very small axial clearance gap 24 (although the thickness of the illustrated gap is exaggerated for clarity of disclosure), providing a restricted radial leakage path between the high pressure region 16 and the low pressure region 18.

The specific manner of securing and sealing the mating ring 22 to the shaft 12 is of no concern, and is not even illustrated. The specific manner of keying and sealing the primary ring 20 to the housing 14 also is of little concern, although the same is illustrated, in the disclosed mechanical seal.

A retainer 26 is axially secured and nonrotatably secured in the housing 14 by conventional means (not shown). The retainer 26 has an outer cylindrical surface 28 disposed closely adjacent an inner cylindrical surface of the housing; and an O-ring 30 is compressed in a groove in the retainer outer surface, to define a fluid tight seal between these components. The retainer 26 is thus nominally positioned coaxially of shaft 12. At inner cylindrical surface 32 of the retainer 26 is spaced from the shaft 12, allowing unrestricted clearance between these components in this region. The retainer 26 also has axial extended circumferentially spaced key pin slots; and key pins 34 are adapted to fit in these slots and correspondingly located grooves 36 formed in the primary sealing ring. The primary sealing ring 20 is thus keyed against rotation relative to the housing 14, while it can be shifted axially relative to the housing 14, and to the shaft 12.

The retainer 26 also has a smooth cylindrical sealing surface 38, disposed concentrically of the shaft 12 and inwardly spaced for the primary sealing ring 20.

An annular disc member 40 is mounted to slide freely on the retainer surface 38, between a radial wall 42 of the retainer 26 and the primary sealing ring 20. Inner diameter 40d is larger than the outer diameter of surface 38. This clearance is large enough to permit the disc to freely move axially of the cylindrical surface 38. A plurality of circumferentially spaced axially aligned compression springs 44 are disposed between outboard radial wall 40b of the disc 40 and spring seats 46 formed in the radial retainer wall 42. The compression springs 44 urge inboard radial wall 40i of the disc 40 axially of the shaft 12 and against outboard radial wall 20b the primary sealing ring 20, which in turn urges the sealing faces 20f and 22f together.

Annular notch 48 is formed in the primary sealing ring 20 adjacent outboard wall 20b and inside diameter 20d. Diameter 20d is larger than the smooth axially cylindrical sealing surface 38 of the retainer 26 by an amount sufficient to provide necessary clearance. In a three inch (or larger) diameter seal, this clearance could be 0.060 inches. An O-ring 50 is fitted in notch 48. The inboard wall 40i of the disc 40 closes the open side of the notch 48 and holds the O-ring 50 therein. The O-ring 50 establishes a gas-tight seal between the primary ring 20 and the retainer 26; and as noted above, the retainer 26 is sealed relative to the housing 14. Thus, all and/or any flow of the contained gas from the high pressure side 16 to the low pressure side 18 of the mechanical seal is via the gap 24 between the sealing faces 20f and 22f. It should be noted that the illustrated seal 10 is an O.D. pressurized seal, with the high pressure acting on the outer diameter of the primary ring 20. The principles of the invention are also applicable to I.D. pressurized seal where high pressure is at the inside diameter of rings 20 and 22.

When the shaft 12 is not being rotated, the sealing faces 20f and 22f may typically be biased by springs 44 into flush contact against one another, preventing gas flow across the mechanical seal 10. When the shaft 12 is being rotated, hydrostatic and/or hydrodynamic fluid film forces come into play to create the gap 24 between the sealing faces, to a thickness until the fluid film pressures balance against the forces of the springs 44 and the fluid pressure acting on the spring side of the primary ring 20. As has been noted, the properly designed seal gap 24 may be measured in tenths-of-thousandths of an inch (0.0001"), to minimize the leakage flow in the fluid film, while yet eliminating direct contact between the sealing faces, for reduced wear and/or heat buildup of such faces, and for reduced frictional drag and power consumption between the faces.

In the mechanical seal illustrated in FIG. 1, in order to withstand the temperatures and pressures to be encountered, the mating ring 22 may be formed of plated steel or tungsten carbide; the primary or floating ring 20 may be formed of carbon; and the disc 40 and other structural components such as the shaft 12, housing 14 and/or retainer 26 may be formed of a stainless steel. The cooperating sealing faces 20f and 22f thus are somewhat durable, although the sealing face 20f of the primary sealing ring 20, being of carbon, is decidedly softer and more distortable than the sealing face 22f of the mating sealing ring 22 formed of tungsten carbide. The stiffness of carbon is ten times less than steel. The carbon ring is dramatically more susceptible to distortion from the pressures and temperatures of operating than steel or tungsten carbide.

The mechanical seal 10 may be particularly useful with a shaft 12 having a diameter in excess of three or more inches; and the primary sealing ring 20 and disc 40 will of course be even larger than this operating at pressures of 2000 psi or more and temperatures of 500° F. or more. The primary sealing ring 20 may be less than one-half of an inch thick axially, and the disc 40 may be less than one-quarter of an inch thick axially; to make them light to respond rapidly to the dynamic forces of operation. Such forces also cause distortion and unequal loading and the spring ring may twist and/or deform and/or cant under operating conditions to become out of parallel with the sealing face 22f on the heavier mating sealing ring 22. Centering of the axis of the two relatively rotating rings is important to overall seal performance and life.

In the seal 10 of the FIG. 1, the O-ring 50 centers the primary ring 20 relative to the shaft 12, via the cooperation with the retainer axially extending annular surface 38. However, as the primary ring 20 is fabricated of a relatively soft material . . . carbon, it is difficult to form the notch 48 with accurate tolerances; and moreover such notch may further more readily fail when subjected to the stresses of operation. Also, the disc 40 has no vertical support, other than when its inner diameter 40d rides on the retainer surface 38. This can occur when the disc 40 is forced off center relative to the shaft, by gravity or other force as illustrated in FIG. 6. In this offset condition, the disc 40 contacts retainer surface 38 in the region 47 or at or near the 12:00 o'clock location and have excessive radial clearance in the region 49 at or near the 6:00 o'clock location. This situation creates a dray against axial movement of the disc 40 and thus the primary ring 20, and encourages the development of nonsymmetrical forces between the sealing faces 20f and 22f.

Figure 2:
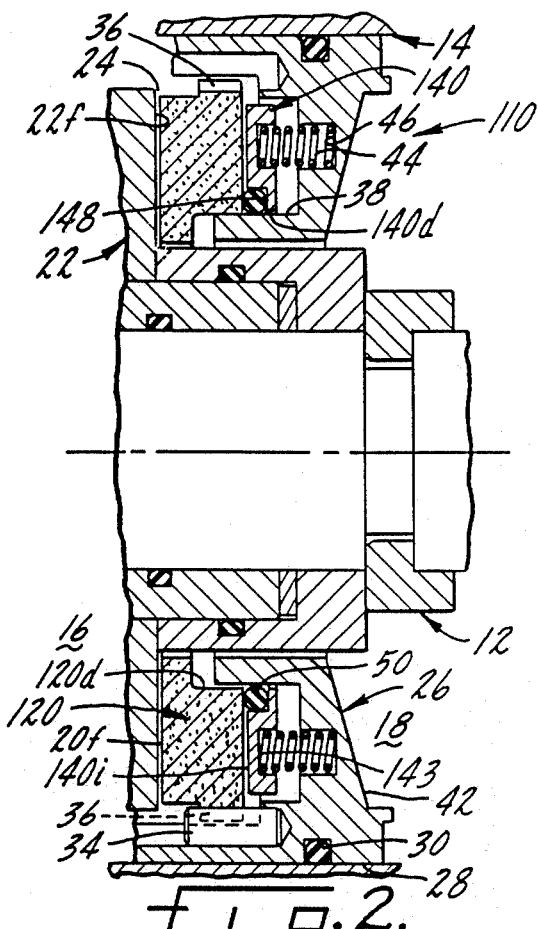
FIG. 2 is a longitudinal sectional view, similar to FIG. 1, except of a second prior art mechanical seal.

The seal 110 illustrated in FIG. 2 is an improved version of the seal 10 of FIG. 1. The shaft 12, housing 14, retainer 26 and many other components are similar to those already mentioned with respect to the seal 10, and are identified with the same reference numbers used in the disclosure of the seal 10. However, the annular primary ring 120 does not have a notch formed therein, but has a sharp angled corner. Disc 140 is of an axial thickness which is about two times that of disc 40. The primary ring 120 is correspondingly thinner in the axial direction. Annular notch 148 is formed adjacent inboard face 140i in the disc 140 and inner diameter 140d, adjacent the retainer surface 38. An O-ring 50 is fitted in this notch. The O-ring 50 cooperates between the primary ring 120 and housing 12, via the surface 38 of retainer 26, to establish a gas-tight seal between these components in this region. Also, the disc 140 has a recessed seat area 143 to receive each spring 44.

As the O-ring notch 148 is formed in the disc 140, fabricated of a relatively tough material . . . stainless steel, the fabrication may be done with accurate tolerances, and the finished disc 140 will be durable, to withstand the stresses of operation . . . compared to the seal 10 of FIG. 1.

The O-ring 50 centers the disc 140 relative to the retainer surface 38. However, the primary sealing ring 120 is no longer centered, but due to gravity and as illustrated in FIG. 6, bottoms against the retainer surface 38 in the region 47 at or near the 12:00 o'clock location, or less frequently against the keying pin(s) 34 at or near the 6:00 o'clock location (such a situation is not illustrated) . . . depending on the relative tolerance of these components.

As the primary sealing ring 120 is made of the relatively soft and deformable carbon, in the illustrated O.D. pressurized seal on increasing temperature and pressure caused by operation of the compressor pump or other device in which the seal is installed, it will be compressed inwardly. Knowing this, radial design clearances greater than such deformation have to be provided between the inner diameter 120d of the primary sealing ring and the outer dimension of the shaft or surface 38 of retainer 26. For a three inch seal this clearance could be 0.060 inches or more. Thus eccentric positioning of primary ring 120 could be 0.030 inches. During initial operation of the seal without pressure, the primary sealing ring 120 is eccentrically supported on its I.D. relative to the shaft; which creates non-uniform loading of the sealing faces 20f and 22f when the pressure buildup occurs.

The eccentric position of primary ring 120 is illustrated in FIG. 6. In the embodiment of FIG. 1 disc 40 was free to be forced by gravity into the eccentric position illustrated. In the embodiment of FIG. 2 it is seal ring 120 that is free to be caused by gravity to assume an eccentric position. Inner diameter 120d contacts outer diameter 38 of retainer sleeve 26 and all clearance is accumulated at the 6:00 position identified by numeral 49. The ring contacts surface 38 at point 47. The foregoing factors adversely reduce the sensitivity of the I.D. centered, O.D. pressurized seal 110. Thus, although the hydrostatic and/or hydrodynamic gas forces between the sealing faces 20f and 22f try to counterbalance the forces of the springs 44 and of the fluid pressure acting on the spring side of the sealing ring, the sealing ring 120 may not move uniformly, radially and/or axially of the shaft, yielding an inappropriate or non-uniformly gap 24 having a localized sealing face contact and/or excessive leakage path.

Figure 3:
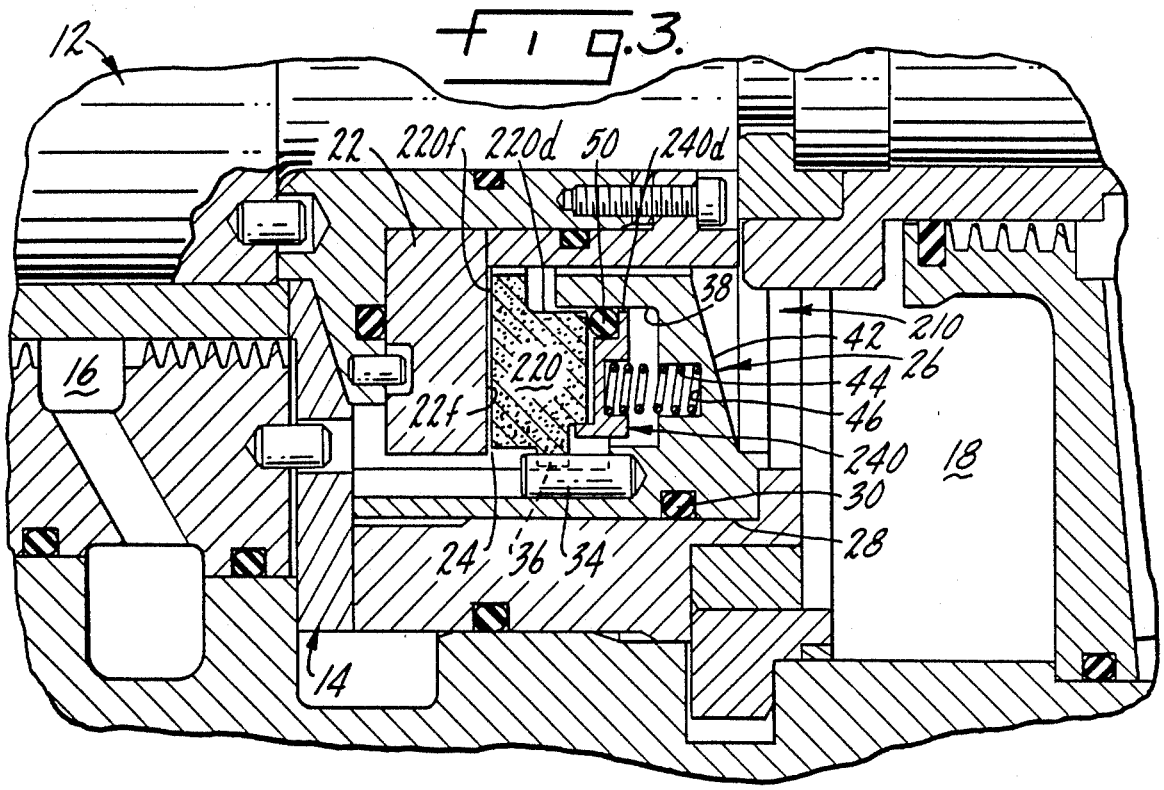
FIG. 3 is an enlarged fragmentary longitudinal section, similar to FIGS. 1 and 2, taken at 3—3 of FIG. 7 showing only the lower half of an improved mechanical seal of this invention.

FIG. 3 illustrates an embodiment of the improved seal 210 of the present invention. It should be noted that FIG. 3 is the cross section of the bottom of the seal, at the 6 o'clock position as indicated on FIG. 7. Again, the shaft 12, housing 14, retainer 26 and many other components are similar to whose already mentioned with respect to the seals 10 and 110, and are identified by the same reference numbers that were used in the disclosure of these seals.

In the seal 210, disc 240 is disposed between primary sealing ring 220 and the retainer wall 42, similar to the seal of FIG. 2. A notch 148 is formed in disc 240 adjacent radial inboard surface 240i and inner diameter 240d. The inner diameter 240d is larger than cylindrical surface 38 of retainer 26 by an amount to permit clearance at all operating conditions. O-ring 50 is fitted in notch 48 and is compressed against the notch 48 and the outboard radial surface 220b of the primary sealing ring 220. These features are similar to the seal 110 of FIG. 2 establishing a gas-tight seal between the primary ring 220 and housing retainer 26, and centering the disc 240 relative to the retainer surface 38 and shaft 12.

The seal 210 differs from seal 110 in that an annular lip 250 is formed at the outer edge of the disc 240, extending axially, having a cylindrical inner surface 251 inboard of radial inboard surface 240i and adapted to overlie with very close radial tolerance a cylindrical surface 252 formed by relief 253 at the other periphery of ring 220 adjacent outboard surface 220b. By way of example, such radial tolerance may comprise only several thousandths of an inch (0.002–0.008") relative to an overall diameter of ring 220 and disc 240 components of possibly three or more inches.

The radial clearance between the inner surface 251 of disc lip 250 and the sealing ring relief surface 252 is much less than the radial clearance between the inner diameter between inner surface 220d of the primary sealing ring 220 and cylindrical surfaces 38 which could be 0.060 inches or more.

The O-ring 50 centers the disc 240 relative to the retainer surface 38 and shaft 12; while the close tolerance between the inner surface 251 of disc lip 250 and the O.D. of the relief 252 formed on primary sealing ring 220 provides that the disc 240 also then centers the primary sealing ring 220 relative to the same retainer surface 38 and the shaft 12. This centering is effective to center the primary ring relative to mating ring 20 on shaft 12. As the O-ring notch 148 and centering lip 250 are formed upon the disc 240, fabricated of a tough steel material, the fabrication may be done with accurate tolerances, and will provide a disc sufficiently durable to withstand the stresses of operation.

Upon a buildup of the contained pressure behind the O.D. pressurized seal 210, and also as a result of elevated temperatures which exist during operation, the primary sealing ring 220 is caused to be compressed inward and move away from lip 250. The ring 220 is then free from contact with lip 250 at relief surface 252 and also free from contact of inner diameter 220d with cylindrical surface 38. The primary ring is thus captured between mating ring 22 and radial inboard surface 240i of disc 240 in centered relation to primary ring 220. It is also free of possible undesirable contact with surface 38 which could adversely affect seal operation. This centered position, as illustrated in FIG. 7 is thus provided at rest or during operation. The clearance at points 47 and 49 of FIG. 7 are essentially equal insuring concentric response of the seal to levels caused by operating pressure and temperatures.

The sealing faces 20f and 22f, starting in a centered orientation without the contained fluid pressures, more reliably remain centered and symmetrical of the shaft 12. The centered sealing faces being substantially parallel, minimize possible sealing face contact and the resultant gas leakage through a nonsymmetrical gap 24, between the high and lower pressure regions 16 and 18 on opposite sides thereof.

The present invention provides a seal with an axially moveable sealing ring with an axially moveable sealing ring that is centered at a peripheral edge exposed to the high pressure to be sealed. On pressure increase the seal ring is caused to move away from engagement with the centering means, yet remain coaxial with its mating ring. This principle is applicable to both O.D. pressurized seals, as are illustrated and I.D. pressurized seals as well. In it preferred form centering of the axially moveable ring is provided by a disc centered with respect to the shaft which carries the mating sealing ring. The disc includes an annular lip which surrounds a portion of the periphery of the seal ring which is exposed to the pressure to be sealed. On increase of pressure caused by operation of the device in which the seal is installed, the primary or axially moveable ring is forced away from its contact with the lip but is held in a radial centered position by the operating forces encountered.

As can be seen from the FIG. 3 illustration of the mechanical seal, neither the shaft 12 nor housing 14 is a single member; but each has several components in the form of sleeves or flanges. Nonetheless, these components are adapted to be secured rigidly to the shaft 12 or housing 14, and act together as a single component. Accordingly, reference to the shaft or housing is to be considered broadly, in this context.

While only a single embodiment of the invention has been illustrated, it is apparent that variations may be made therefrom without departing from the inventive concept. Accordingly, the invention is to be limited only by the scope of the following claims.

We claim:

1. A mechanical seal for providing fluid tight sealing between a housing and a shaft adapted to rotate relative thereto, said mechanical seal comprising adjacent annular primary and mating rings defining generally radial mating sealing faces;

one of said rings being sealed and connected nonrotatably relative to the housing, coaxially of said shaft and the other of the rings being sealed and connected coaxially of the shaft to rotate therewith;

one of the rings being moveable axially of the shaft;

biasing means adapted to urge the axially moveable ring toward the other, to bring said sealing faces close to one another, to have a rotatable sealing engagement relative to one another;

means positioning said axially moveable ring generally coaxially of the other ring, said means including centering means positioned generally coaxially of said shaft;

means on said centering means engaging said axially moveable ring and positioning said axially moveable ring generally coaxially of said shaft.

2. A mechanical seal as claimed in claim 1 wherein said centering means contacts said axially moveable member adjacent the peripheral edge thereof exposed to the pressure of the fluid to be sealed.

3. A mechanical seal as claimed in claim 2 wherein said centering means includes a disc disposed coaxially of said shaft intermediate said axially moveable ring and said biasing means.

4. A mechanical seal as claimed in claim 3 wherein said axially moveable ring includes an outboard radial face and said disc includes an inboard radial face in contact with said outboard radial face of said axially moveable ring, said disc includes a lip extending axially inboard of said inboard radial face of said disc and surrounds a portion of one of the inner or outer periphery of the axially moveable ring to support the same in general coaxial alignment with said other ring.

5. A mechanical seal as claimed in claim 4 wherein said axially moveable disc is fixed against rotation to said housing.

6. A mechanical seal as claimed in claim 5 wherein said lip supports a cylindrical shoulder formed adjacent the outer peripheral edge of said axially moveable ring.

7. A mechanical seal as claimed in claim 5 wherein said centering means includes a sleeve fixed to said housing coaxially disposed relative to said shaft and sized to permit said shaft to rotate with respect thereto, an O-ring is compressed between said disc and said sleeve to coaxially align said disc relative to said sleeve.

8. A mechanical seal as claimed in claim 6 wherein said lip is formed adjacent the outer periphery of said disc and is extended inboard of said inboard radial face.

9. A mechanical seal as claimed in claim 7 wherein said shoulder of said axially moveable ring is of a diameter less than the diameter of the outer periphery of said axially moveable ring and said lip of said disc defines a cylindrical surface which surrounds and supports said shoulder.

* * * * *